United States Patent [19]

Netzel

[11] 4,063,355
[45] Dec. 20, 1977

[54] CUTTER FOR HELICALLY CORRUGATED TUBE FOR FLEXIBLE GAS INSULATED CABLE

[75] Inventor: Philip C. Netzel, Milmont Park, Pa.

[73] Assignee: I-T-E Imperial Corporation, Spring House, Pa.

[21] Appl. No.: 718,880

[22] Filed: Aug. 30, 1976

[51] Int. Cl.² ............... B23D 21/06; B26B 27/00; B26D 3/16
[52] U.S. Cl. ............................ 30/96; 30/90.2; 30/101
[58] Field of Search ............ 30/101, 102, 95, 96, 30/94, 93, 90.2, 90.3

[56] References Cited

U.S. PATENT DOCUMENTS

| 760,128 | 5/1904 | Jackson | 30/101 X |
|---|---|---|---|
| 1,279,022 | 9/1918 | Scott | 30/96 |
| 1,373,300 | 3/1921 | Caffrey | 30/101 X |
| 1,727,225 | 9/1929 | Acres | 30/96 |
| 1,897,374 | 2/1933 | Goebel | 30/102 |
| 2,518,074 | 8/1950 | Sauter | 30/96 X |
| 2,571,916 | 10/1951 | McKinley | 30/96 X |
| 2,735,175 | 2/1956 | Tallman | 30/102 X |
| 2,747,275 | 5/1956 | Jonasson | 30/101 |
| 3,150,447 | 9/1964 | Gill | 30/96 |
| 3,798,765 | 3/1974 | Mattsson | 30/96 |

FOREIGN PATENT DOCUMENTS

| 652,388 | 4/1951 | United Kingdom | 30/96 |

*Primary Examiner*—James L. Jones, Jr.
*Assistant Examiner*—J. T. Zatarga
*Attorney, Agent, or Firm*—Ostrolenk, Faber, Gerb & Soffen

[57] ABSTRACT

A cutter for a helically corrugated tube in which a pair of rings are connected by a blade carrier to form a track around the tube. Each of the rings comprises a pair of "C" members hingedly connected at one end and releasably connectable at the other end to form the ring. Each "C" member has a pair of rails supporting a circumferentially movable carrier having rollers at each end engaging the rails of the adjacent pair of rings. A holder on the carrier projects outwardly between the rails. A yoke in the holder carries the cutting blade; a compression spring in the holder drives the yoke and blade toward the tube. A threaded cup on the holder adjusts the compression spring and also provides a handle recess.

9 Claims, 5 Drawing Figures

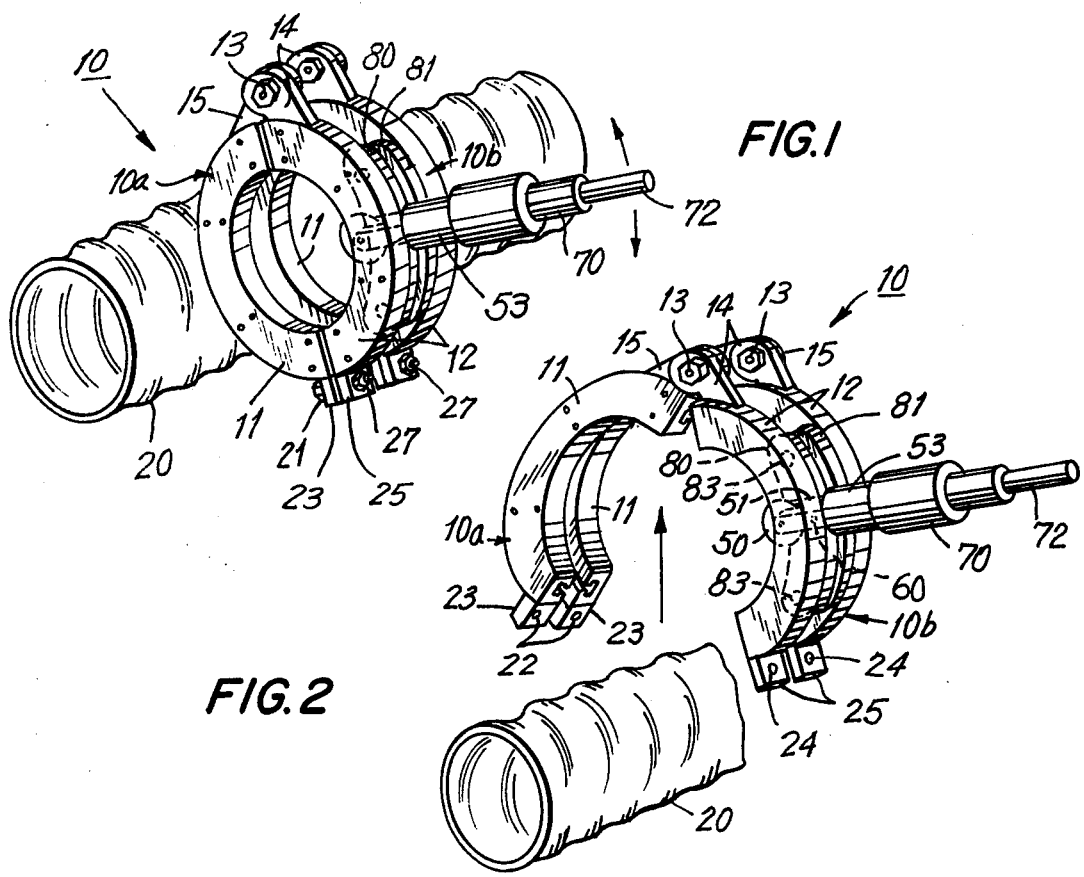
FIG.1
FIG.2
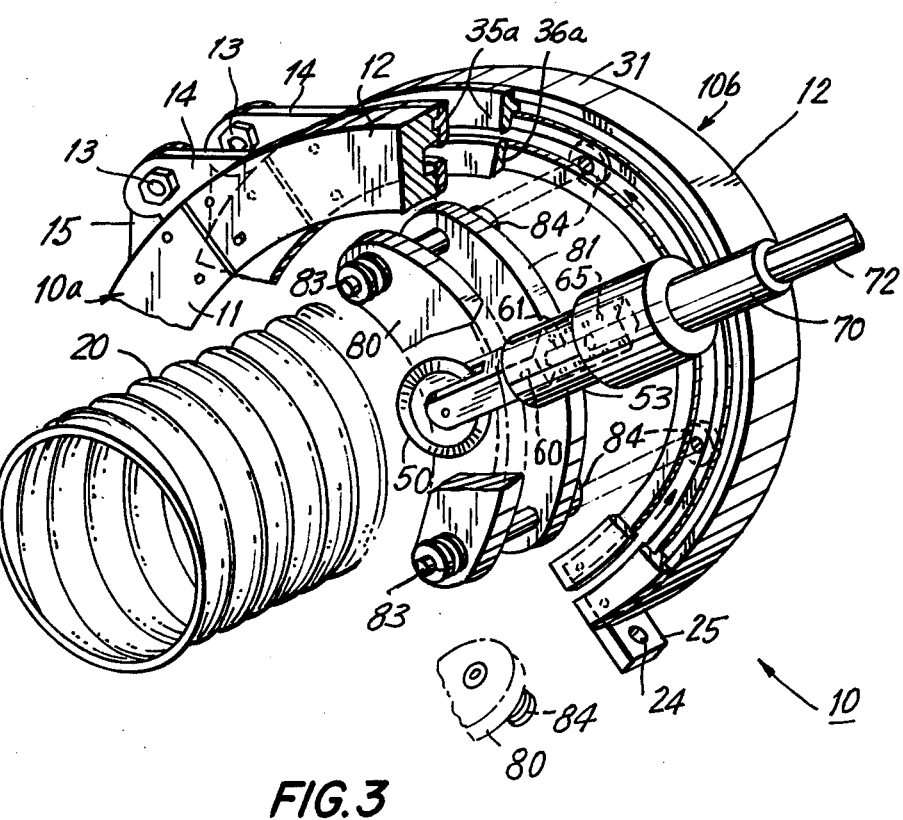
FIG.3

CUTTER FOR HELICALLY CORRUGATED TUBE FOR FLEXIBLE GAS INSULATED CABLE

The present invention relates to a cutter for a helical corrugated tube of the type forming a corrugated pipe enclosure which may be used for flexible gas insulated cables, other types of electrical conductors, water systems, heating systems, and other applications for which a flexible cable is suitable. If a fault or other defect occurs in such pipe or tube, it may be desirable to open or remove the outer enclosure from the faulted section in order to make the necessary repairs.

However, to prevent contamination of the interior of the enclosure it is necessary that the cutting of the enclosure be done in a manner which does not produce metallic dust or chips. This, therefore, precludes the use of a saw, a grinding wheel, or a torch, or any other device for opening the enclosure which will produce metallic dust or chips.

The present invention is directed to a cutter which will permit the opening of the enclosure without creating harmful metal slivers or chips.

Essentially the cutter is arranged in such a manner that a pair of circular support members each in the form of two "C" elements hinged together at one end of each is mounted on the helical corrugated enclosure and connected together at the other end to form a full circumferential track encircling the enclosure. The "C" sections forming each ring are sufficiently wide so that the transverse interior dimension thereof will pick up at least the peaks of two adjacent corrugations and thus can be clamped tightly down on the helical corrugated enclosure. The pairs of clamping members forming the two rings are spaced from each other and connected by a blade carrier and straddle the area at which it is desired to make the cut into the tube. Preferably, the clamping rings are made of aluminum for weight reduction.

The clamping rings are so arranged that acting together, they will guide a blade which may be manipulated circumferentially with the clamping ring in contact with the helically corrugated tube and thereby effect the cut. The cutting element is so arranged that it will not produce any metallic chips but basically will tear the wall of the helical corrugated metallic tube and thereby permit the tube to be opened. The cut may be made successively at two spaced sections on either side of the fault or defect which is to be repaired. The cut may be made a full 360° on each side of the fault or defect so that the tubular section at the fault area may be completely removed or the cut may be made 180° or larger on each side of the fault and the tubular section opened up sufficiently to permit observation and repair of the fault area; thereafter the tubular section may be closed and if desired sealed by an additional tube or binding. When the cut is made a full 360° on each side of the fault, the cut out tube may be dropped out; or when an internal structure stands in the way of complete removal, the cut tube may be dropped low and the section thereof beyond the boundary of the remaining pipe may be cut in any manner for removal, thereby eliminating the possibility contaminating the interior of the pipe or tube.

The primary object of the present invention, therefore, is the provision of a cutting device primarily for helically corrugated flexible metallic enclosures for gas insulated cables which will be so arranged that it may readily cut the cable circumferentially while preventing the formation of metallic dust or chips which in the insulated electrical environment which is to occur after the repair has been made, would be deleterious to the proper operation of the insulated cable.

The foregoing and many other objects of the present invention will become apparent from the following description and drawings in which:

FIG. 1 is a view in perspective of the novel cutting structure of the present invention mounted on a helical corrugated tube.

FIG. 2 is a view in perspective corresponding to that of FIG. 1 showing the ring sections of the clamping or support member of the cutter opened up so that they may be placed over the tube or removed from the tube.

FIG. 3 is an enlarged detailed view in perspective with some of the elements shown broken away so that the operation of the device may readily be seen.

Figure 4:
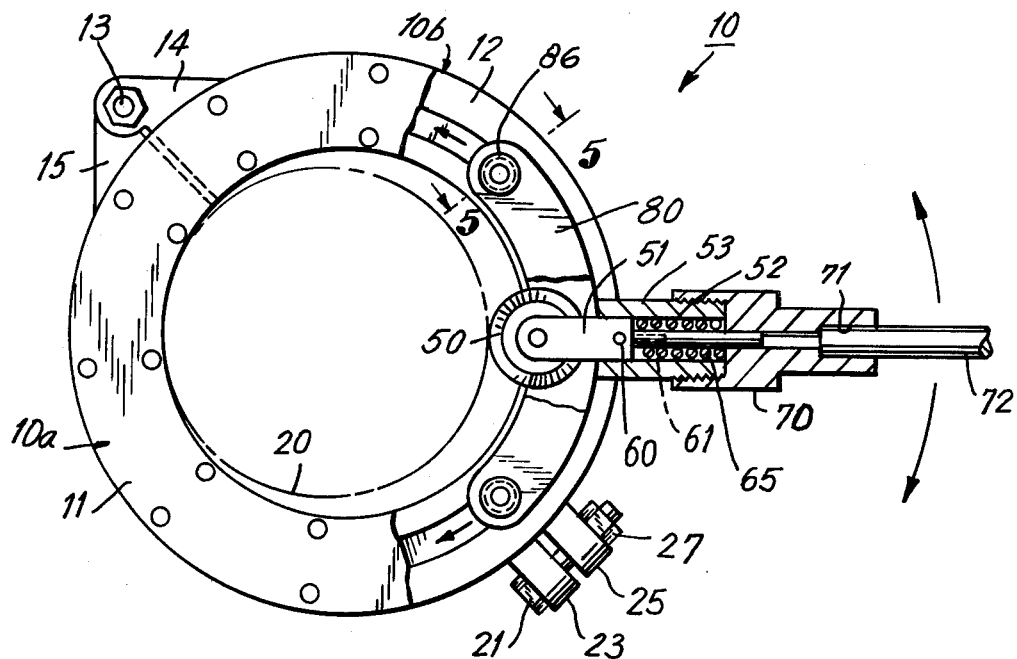
FIG. 4 is a side view of the cutter of the present invention in place at the location of FIG. 1 with a portion of one of the rings forming the composite circumferential cutter broken away so that the operation may be seen.

Referring to the figures, the cutting knife support 10 comprises a pair of separate rings 10a and 10b. Each ring 10a and 10b consists of the two "C" rings 11 and 12 which are hingedly connected together by the pin 13 extending through the lugs 14 and 15 on the respective members 12 and 11. The "C" rings 11 and 12 of each ring 10a and 10b may be opened up around the hinge 13 as shown in FIG. 2 and placed over the metallic helically corrugated pipe 20 and a bolt 21 may be passed through the corresponding openings 22 in extension 23 of the "C" ring 11 and opening 24 of extension 25 of the "C" ring 12 and a nut 27 may be tightened down on the bolt as shown by comparison of FIGS. 1, 2 and 4 in order to integrate the "C" rings 11 and 12 into the circular cutting support rings 10a and 10b. The rings 10a and 10b are spaced by and connected by the cutter 80–81 as hereinafter described.

Figure 5:
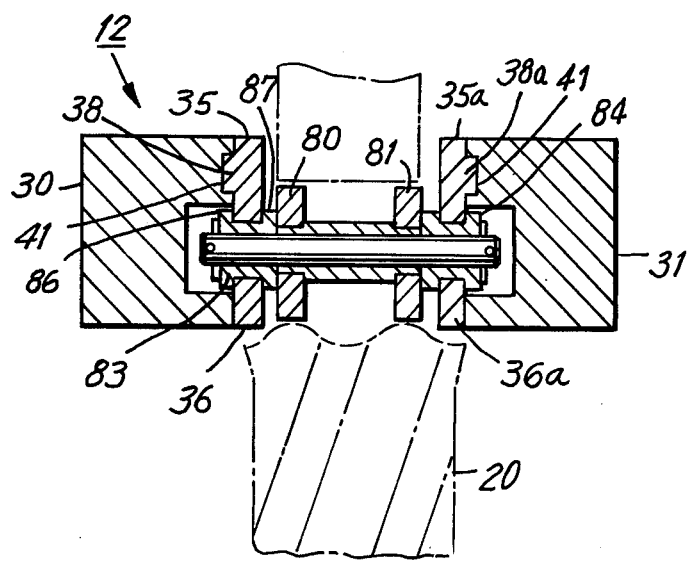
FIG. 5 is a cross-sectional view taken from line 5—5 of FIG. 4 looking in the direction of the arrows.

Each "C" ring 12 of ring 10a as seen in the view of FIG. 3 and especially in the cross-sectional view of FIG. 5 is duplicated by the "C" ring 12 of ring 10b. Similarly, the "C" ring 11 of ring 10a is duplicated by ring 11 of ring 10b. Each of the elements 30, 31 of the "C" rings 11 and 12 in each ring 10a and 10b is provided with outer track members 35 and 35a and inner track members 36 and 36a. Elements 35 and 35a are provided with a spline or key 38 which positions them securely. The spline 38 extends in the keyway 31 of ring member 30 and similarly the spline 38a extends in the keyway 41 of member 31 in order to provide an appropriate anchor for the track members 35 and 35a which will resist outward forces. In addition the track members 35 and 35a are preferably bolted into the members 30, 31 in a manner which will be obvious but is not shown. The inner track members 36 and 36a are merely bolted to their respective ring sections 30 and 31; no spline or keyway is there necessary since the knife pressure is exerted radially outwardly against the track sections 35 and 35a. Hence the track sections 36, 36a merely cooperate with the track sections 35, 35a to provide a guide for the rollers carrying the knife element as hereinafter described.

The track members of "C" rings 11 and 12 line up with each other to form a circumferential track in each of the rings 10a and 10b. The flanged rollers 83, hereinafter described, on the side supports 80 and 81 of the knife carrier engaging the two tracks of 35–35a and 36–36a of the two adjacent rings 10a and 10b space the rings appropriately.

The cutting wheel or blade 50 is carried in a yoke 51 of rectangular cross section which in turn fits into the longitudinal opening 52 (which opening is of corresponding square shaped cross section) in the cylindrical holder 53. A retaining pin 60 is fixed in the yoke 51. This retaining pin rides in the slots 61 on opposite sides of the interior opening 52 of the cylindrical member 53 and also prevents separation of the two parts when loaded by the compression spring 65. Cap 70 is threaded onto the holder 53 and may be rotated downwardly to increase the load on the spring 65 or rotated outwardly to decrease the load on the spring 65. The cap 70 is also provided with a recess 71 into which a handle 72 may be removedly fitted in order to operate the knife. The holder 52 is secured in any suitable manner as by welding to two side supports 80 and 81 (see also FIGS. 3 and 5). The side supports 80 and 81 carry at their opposite ends between them the flanged rollers 83, 84 at each end which ride between the tracks 35, 36 on one side and the tracks 35a and 36a on the other side in the ring sections 30, 31 of the "C" ring elements 11 and 12. The flanged rollers 83, 84 are so arranged that the ends of tracks 35, 35a are received between the flanges 86, 87 (see FIG. 5) and the outer end of tracks 36, 36a are similarly received between the same flanges 86, 87.

It will be seen that the knife 50 on the carrier 80 may be moved circumferentially with respect to the rings 10a and 10b.

The knife 50 may be moved 360° and more several times in the same direction, or back and forth as desired. It may require as many as four passes over any section to cut through. Before the two sets of "C" rings forming rings 10a and 10b are closed around the tube 20, the flanged rollers 83 are inserted into the open end of one of the "C" rings of each of the rings 10a and 10b and rolled into the track so that the carrier members 80, 81 and their rollers 83 interconnect the "C" rings. On completion of the cut, separation of each "C" ring 11 and 12 at the lugs 23 and 25 in the position of FIG. 2 will permit withdrawal of the cutting apparatus from the tube or pipe. The cutting support members 80 and 81 may be left in the tracks of, for instance, "C" ring 12 of rings 10a and 10b to keep them interconnected or may be completely removed to separate the two rings 10a and 10b. The "C" ring members 11 and 12 of rings 10a and 10b are closed and connected by the bolt 21 and the nut 27 of each "C" ring 11 through the lugs 23 through the holes 22 and 24 in the lugs 23 and 25.

The cutting wheel 50 is thus brought into contact with the tube surface. Moving the handle 72 circumferentially will then start the cutter to penetrate into the tube surface. Depending upon the height of the surface from the peak of the corrugation, which will vary because the corrugation is helical, it may be necessary to make adjustments to the spring force by rotating the cap 70 from time to time as the cutting proceeds around the diameter so that the blade 50 will always be in appropriate contact with the metallic housing 20.

In the foregoing the present invention has been described solely in connection with a preferred illustrative embodiment thereof. Since many variations and modifications of the present invention will now be obvious to those skilled in the art, it is preferred that the scope of the invention defined herein be determined not by the specific disclosures herein contained but only by the appended claims.

What is claimed is:

1. A cutter for circumferentially cutting a flexible helically corrugated pipe;
    said corrugated pipe having a helical ridge and a helical trough defining the corrugation;
    said cutter comprising a pair of rings;
    means for securing said pair of rings around said pipe;
    each ring having a transverse dimension at least equal to the distance between two adjacent runs of helical ridge;
    each ring having a track;
    a blade carrier riding in the track of each ring;
    a cutting wheel blade positioned in said blade carrier;
    said rings and said tracks being interconnected by said blade carrier;
    means on said blade carrier biasing said blade toward said pipe; and
    means for moving said carrier circumferentially in said tracks to effect a cutting operation during movement of said carrier.

2. The cutter of claim 1 in which each ring comprises a pair of "C" shaped members hinged together at one end and means for releasably securing the other end of each "C" shaped member together to form said ring.

3. The cutter of claim 2 in which each of said "C" shaped members in each ring is provided with said track.

4. The cutter of claim 3 in which each said ring comprises a pair of parallel arcuate rails having recesses facing the other ring and forming said track;
    said track in each ring facing the track in the other ring to form a pair of spaced guide tracks;
    said carrier having a pair of rollers at each end thereof engaging said rails of said rings and hence the tracks thereof and interconnecting said rings when said rings are placed on said pipe.

5. The cutter of claim 4 in which a yoke is provided to carry the blade on said carrier; a holder on said carrier having a non-circular longitudinal opening therein; said yoke having a non-circular cross section fitting into said holder.

6. The cutter of claim 5 in which said holder has compression spring bearing on said yoke and driving said yoke and blade toward said pipe.

7. The cutter of claim 6 in which an adjustable cover is provided for said holder for varying the pressure of said spring.

8. The cutter of claim 7 wherein said adjustable cover has an extension with means for releasably engaging a handle; and a handle for releasable engagement with said means.

9. The cutter of claim 7 wherein said holder projects between said rails radially outwardly from said ring.

* * * * *